July 20, 1948.    H. N. WHEELER    2,445,547
DUAL TIRE VALVE
Filed Aug. 23, 1945
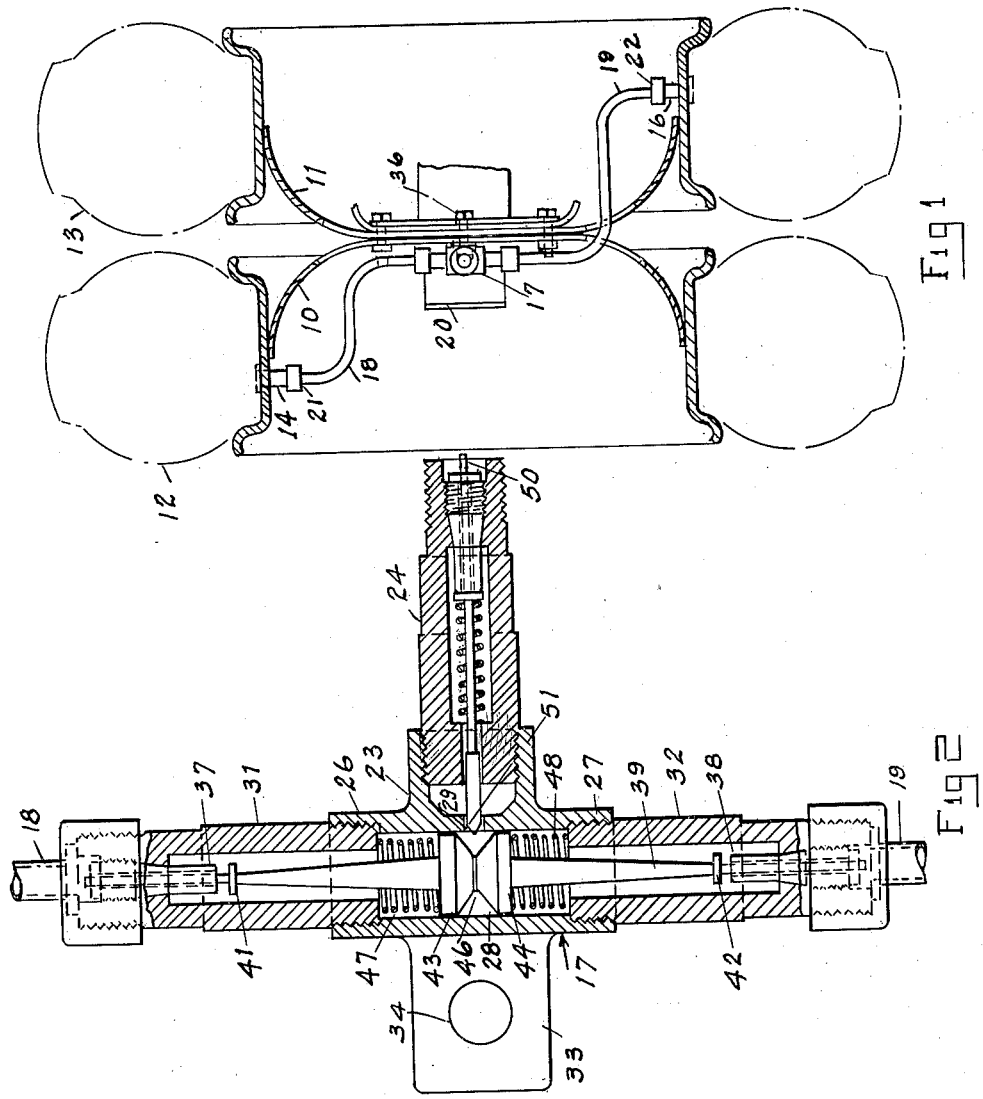
HARRY N. WHEELER
*INVENTOR.*
BY *Henry L Jennings*
ATTORNEY Patented July 20, 1948

2,445,547

UNITED STATES PATENT OFFICE 2,445,547

DUAL TIRE VALVE

Harry N. Wheeler, Birmingham, Ala., assignor to Dual Valve Company, Birmingham, Ala., a copartnership composed of Harry N. Wheeler and Ormond Somerville Application August 23, 1945, Serial No. 612,246

6 Claims. (Cl. 277—7)

This invention relates to a dual tire pressure equalizing device and has for an object the provision of such a device which shall include improved means whereby in the inflation of the tire, equal volumes of air will be introduced into both tires simultaneously thereby insuring an equal inflation pressure.

A further object of my invention is to provide an equalizing device for dual tires including a pair of valves mounted on a single stem, only one of which may seat at a time, together with spring means to hold both valves off their seats during a minimum predetermined differential in pressure in the two tires.

A more specific object of my invention is the provision of an equalizing device of the character described which shall include a pair of valves mounted on a single stem, only one of which may seat at a time, together with means adapted when inflating the tires, to hold both valves off their seats.

As is well known in the art to which my invention relates, the pressure in the tires of dual wheels may vary widely due to unequal cooling of the tires, to occasional slow leaks, and also due very largely to the fact that the valves on the inside tires are hard to get at and workmen are inclined either to over inflate or under inflate them. In devices for equalizing the pressure in dual tires, there are four things which are very important and which are found in my improved device herein disclosed and claimed.

(a) There must be provided means for the equal inflation of both tires. (b) There must be provided means for equalizing the pressures in the two tires at all times when the vehicle is in operation. (c) Means must be provided for closing off the flow of air from one tire to the other upon a sudden decrease in pressure in one of the tires, as in case of a blow out. (d) The device must be so constructed that the equalizing valves will not close when the tire pressure is being checked with the ordinary tire gauge.

Apparatus embodying features of my invention is illustrated in the accompanying drawing, forming a part of this application, in which Fig. 1 is a sectional view of a pair of dual wheels having my improved device applied thereto; and Fig. 2 is a sectional view of the equalizing device drawn to an enlarged scale.

Referring to the drawing for a better understanding of my invention, I show in Fig. 1 dual wheels 10 and 11 having pneumatic tires 12 and 13 mounted thereon. The tire 12 is provided with a regulation inflation valve 14 and the tire 13 is provided with a similar valve 16, which valves require no detailed description. My improved device, indicated generally by the numeral 17 is preferably mounted on or near the hub 20 of the wheels whereby to minimize wear of the parts due to centrifugal force. Flexible tubes 18 and 19 connect the device with the tires 12 and 13 respectively. At the ends of each of the tubes 18 and 19 are the usual inflation chucks 21 and 22 which are screwed onto the inflation valves 14 and 16 and hold the valves off their seats so long as the tubes are connected, all as is well understood.

The equalizing device comprises a T-shaped body 23 having an inflation valve 24 of well known design screwed into one leg thereof and by means of which the two tires 12 and 13 are inflated simultaneously. The aligned legs 26 and 27 of the T-shaped body are formed to provide a cylinder 28 midway the ends. A port 29 leads from the other leg of the T-shaped body so that when the tires are being inflated, air flows through said port into the cylinder 28. A valve casing 31 screws into the leg 26 and a similar valve casing 32 screws into the leg 27. The tube 18 is attached to the outer end of the valve casing 31 and the tube 19 is attached to the outer end of the valve casing 32. A lug 33 carried by the T-shaped body 23 is provided with a hole 34 therein for attaching the device to the hub of the wheels as by means of one of the hub bolts 36.

The valve casing 31 is provided with a valve seat 37 and the valve casing 32 is provided with a valve seat 38. Mounted within the casings and extending through the body 23 is a valve stem 39 carrying on its end valves 41 and 42 which coperate respectively with the valve seats 37 and 38. The stem 39 is of such a length that both valves 41 and 42 cannot be seated at the same time. Mounted centrally on the stem 39, beneath the port 29, is a piston comprising two heads 43 and 44 divided by a relatively deep, V-shaped groove 46 which is disposed directly beneath the port 29. The heads 43 and 44 fit relatively loosely within the cylindrical portion 28 of the body 23 whereby air entering between the heads may flow past them to inflate the tire. A relatively light spring 47 is disposed between the head 43 and the end of the valve casing 31. A similar spring 48 is disposed between the head 44 and the adjacent end of the valve casing 32. The springs 47 and 48 are adapted to hold the valves 41 and 42 off their seats at all times except when there is a predetermined minimum differential of pressure in the tires 12 and 13, whereupon the pressure on the relatively higher pressure side, acting upon the valves and stem, forces the valve on the relatively lower pressure side to its seat and cuts off communication between the tires. The springs 47 and 48 are of such strength that this occurs only in case of a sudden decrease in pressure as when there is a puncture, or blow out in one of the tires. The inflating valve 24 has the usual valve stem 50 protruding outwardly therefrom for engagement by a chuck, not shown, to hold the valve off its seat when inflating the tires or when testing the pressure in the tires with a tire gauge. The stem 50 extends through the valve and is provided on its opposite end with a conical head 51 which, when the valve stem is pushed inwards, enters the V-shaped groove 46 and holds both valves 41 and 42 off their seats.

From the foregoing description, the operation of my improved equalizing device will be readily appreciated. When the tires 12 and 13 are being inflated, both valves 41 and 42 are held off their seats by the conical head 51, air entering through the passage 29 flows equally to both tires, insuring an equal inflation of both tires. This equalization of pressure continues in the normal operation of the tires, but in event of sudden decrease in pressure in one tire, the valve leading to that tire is closed by pressure from the other tire. My device is also especially adapted to allow for checking the pressure in the tires. When the usual tire pressure testing device is attached to the valve 24, the valve stem 50 is pushed inwards so that the conical head 51 holds the valves 41 and 42 off their seats. If one of the tires should have become deflated, the fact will at once be indicated on the pressure gauge.

From the foregoing, it will be apparent that I have devised an improved equalizing device for the pressure in dual tires which is simple and sturdy of construction and reliable in operation.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a pressure equalizing device, a valve body, a pair of aligned valve casings having opposed seats communicating with the body, a single valve member, valves carried by the member adapted to coact with the seats and so disposed that only one valve may be seated at a time, means to admit air between the valves, and means responsive to admission of air between the valves to hold both valves off their seats.

2. A pressure equalizing device comprising a T-shaped body, conduits leading from the body, a pair of aligned valve casings in the body and having opposed valve seats therein, a pair of valves adapted to cooperate with the seats and control the flow of air through the conduits, a member connecting the valves and of such length that only one valve may seat at a time, a piston comprising a pair of heads with a V-shaped groove between them mounted on the stem intermediate the valves, an inflation valve connected to the body opposite the piston, and a conical member carried by the inflation valve and disposed to be moved into the V-shaped groove when the inflation valve is opened to hold the said pair of valves off their seats.

3. A pressure equalizing device comprising a body, a pair of opposed valve seats in the body, a pair of connected valves adapted to cooperate with the seats and control the flow of air from the valve, a member having a circumferential groove therein disposed between the valves and connected thereto, an inflation valve connected to the body opposite said member, and a yieldably mounted pointed member movable responsive to opening of the inflation valve to enter said circumferential groove and hold both of said valves off their seats.

4. In a pressure equalizing device, a valve body, a pair of aligned valve casings having opposed seats communicating with the body, a pair of connected valves adapted to coact with the seats and so disposed that only one valve may be seated at a time, means for holding the valves off their seats against a predetermined minimum pressure, means to admit air between the valves to the casings comprising an inflation valve, and a member carried by the inflation valve disposed to make operative connection with the connected valves and hold both of the same off their seats when the inflation valve is open.

5. In a pressure equalizing device, a T-shaped body having communicating openings in the legs thereof, a valve seat in each opposed leg of the body, a piston disposed in the opposed legs of the body, a valve on each opposed end of the piston disposed to cooperate selectively with the seats, there being a V-shaped groove in the piston disposed in alignment with the opening in the other leg of the body, an inflation valve located adjacent the end of the other leg, a stem for the inflation valve movable inwardly when the inflation valve is opened, and a pin movable inwardly by the stem having an end disposed to fit in the V-shaped groove and open both of the valves carried by the piston.

6. A pressure equalizing device comprising a T-shaped body, a pair of aligned valve casings in the body and having opposed valve seats therein, a pair of connected valves adapted to cooperate with the seats and control the flow of air through the body and casings and so disposed that only one valve may seat at a time, means to hold both valves off their seats against a predetermined minimum pressure differential in the casings, a piston comprising a pair of heads attached to and between the valves and having a V-shaped groove between the said heads, an inflation valve connected to the body opposite the piston, and a conical member carried by the inflation valve and disposed to coact with the V-shaped groove when the inflation valve is opened to hold the valves carried by the piston off their seats.

HARRY N. WHEELER.

REFERENCES CITED

The following references are of record in the file of this patent:

UNITED STATES PATENTS

| Number | Name | Date |
|---|---|---|
| 190,680 | Hammer | May 15, 1877 |
| 1,870,484 | Basta | Aug. 9, 1932 |
| 2,039,343 | Prokul | May 5, 1936 |
| 2,232,601 | Gille | Feb. 18, 1941 |
| 2,311,955 | Merker | Feb. 23, 1943 |